Dec. 29, 1942.  W. H. McGLADE  2,306,892
HAULING SCRAPER
Filed June 7, 1941  3 Sheets-Sheet 1
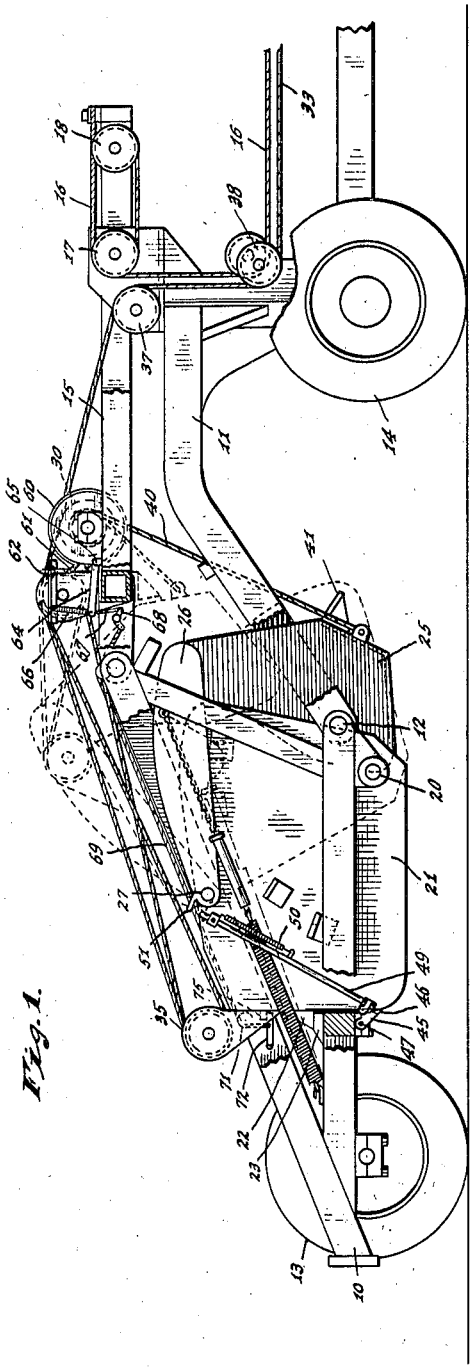
INVENTOR.
Wayne H. McGlade,
BY
ATTORNEYS.

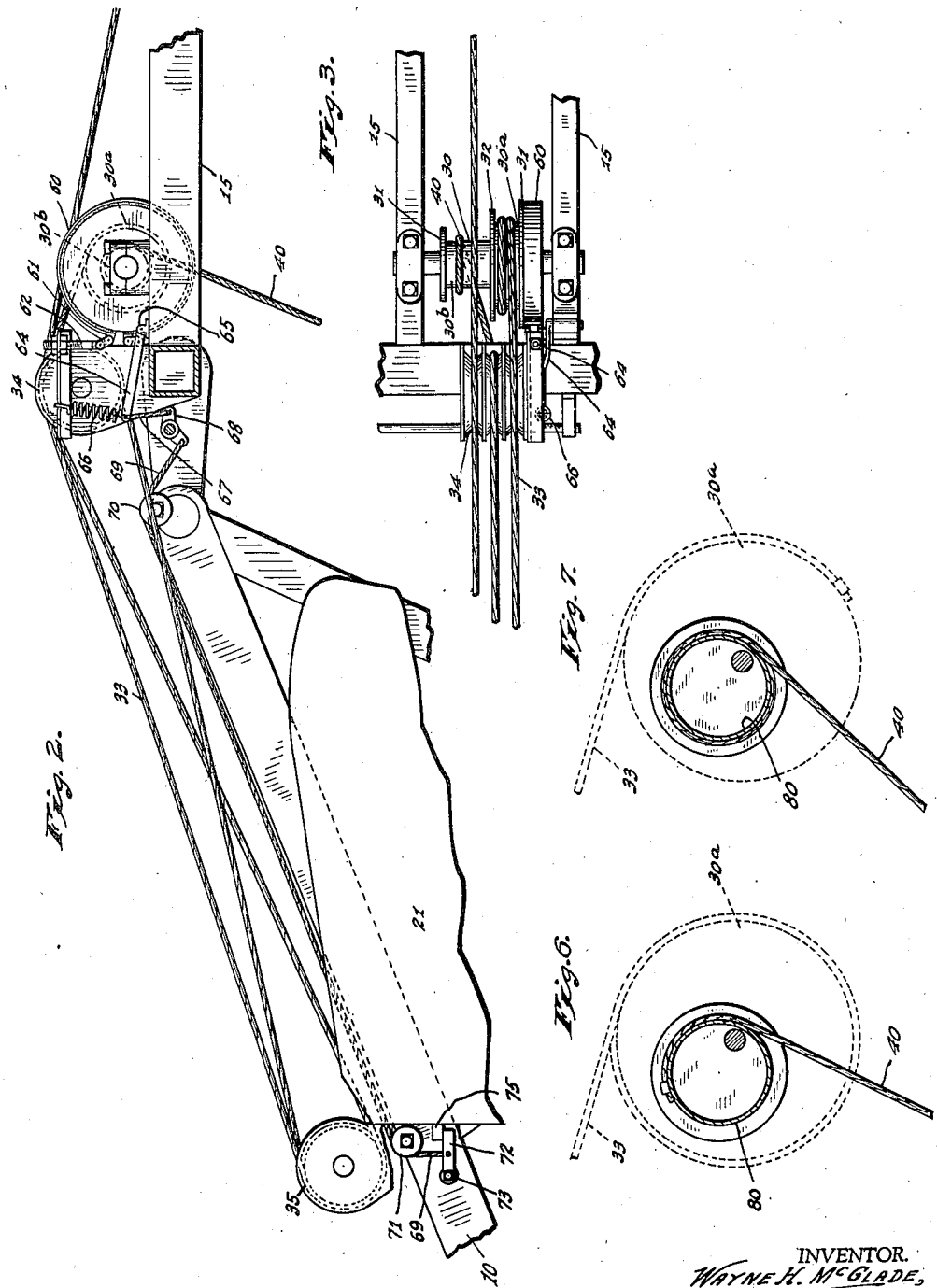

Dec. 29, 1942.  W. H. McGLADE  2,306,892
HAULING SCRAPER
Filed June 7, 1941  3 Sheets-Sheet 3
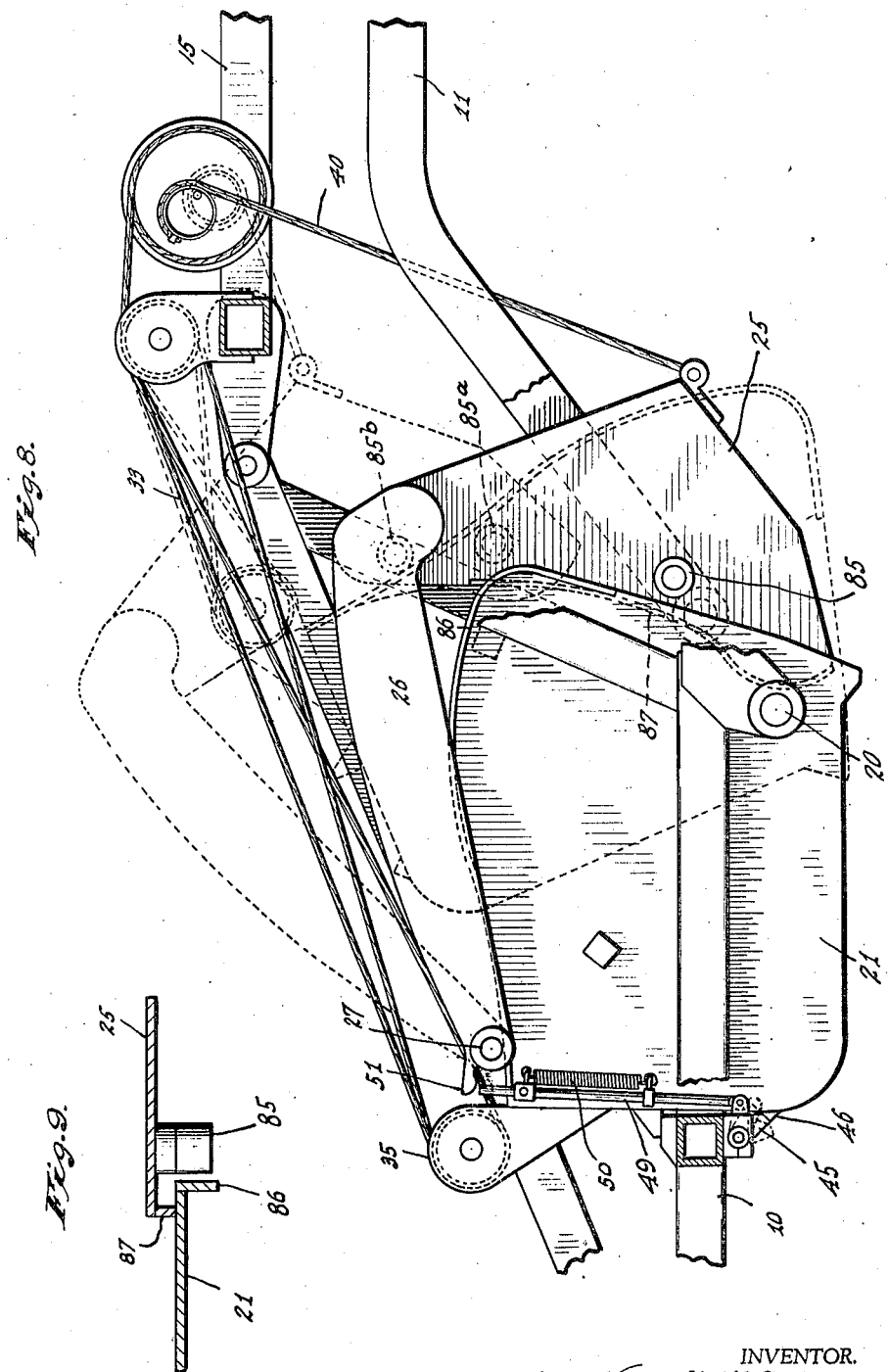
INVENTOR.
WAYNE H. McGLADE,
BY
ATTORNEYS.

Patented Dec. 29, 1942

2,306,892

UNITED STATES PATENT OFFICE 2,306,892

HAULING SCRAPER

Wayne H. McGlade, Indianapolis, Ind., assignor to J. D. Adams Manufacturing Company, Indianapolis, Ind., a corporation of Indiana Application June 7, 1941, Serial No. 396,970

20 Claims. (Cl. 37—126)

My invention relates to hauling scrapers of the type in which an earth-carrying bowl, pivotally mounted in the frame of the machine at its front end and swingable forwardly to dump, has associated with it a closure or apron which can be moved generally vertically into and out of position across the front end of the bowl. It has heretofore been proposed to equip such a machine with a single cable which performs the joint function of raising the apron and tilting the bowl. In such devices, it is customary to dead-end the cable on the frame of the scraper, to pass it around a sheave on the apron and over two sets of sheaves mounted respectively on the frame and the bowl and thence forwardly to a hoist on the tractor by means of which the scraper is drawn. The application of tension to this cable tends both to raise the apron and swing the bowl upwardly and forwardly into dumping position, the sequence of apron and bowl movements being determined either by the relative weights of those elements or by suitable latch mechanism. Such a single-cable control of the apron and bowl has certain disadvantages in that it embodies restrictions on the flexibility of operation of the machine and also in that it necessitates on the apron a sheave pulley which frequently drops into the dirt.

It is the object of my invention to overcome the above noted disadvantages of a single-cable control of the apron and bowl while still retaining the advantages of such structure. A further object is to eliminate the sheave necessarily mounted on the apron in single-cable control arrangements.

In carrying out my invention, I provide a vehicular frame upon which there is arranged a bowl pivoted at its front end to the frame so as to be capable of swinging upwardly and forwardly to a dumping position. The front end of this bowl is open, and to close it I provide an apron or closure carried by arms which are pivoted to the frame of the scraper above and in rear of the bowl-pivot. The frame of the scraper carries a drum rotatable about a horizontal transverse axis, and adapted to be wound upon such drum are two independent cables. One of these cables passes directly from the drum to the apron or closure where it is dead-ended. The other cable, after being dead-ended on the drum, is wrapped around it several times and then passes over two sets of sheaves mounted respectively on the frame and on the rear end of the bowl, from the last of which sheaves the cable passes forwardly to a suitable hoist on the tractor which draws the scraper. The two cables are wrapped around the drum in opposite directions so that as one cable is wound upon the drum in the rotation of the latter the other will be unwound. If, with the apron and bowl both lowered, or in the positions they respectively occupy when the scraper is transporting earth, tension is applied to the cable extending forwardly to the tractor, that cable is first pulled through the sheaves on the frame and bowl as it unwinds from the drum. This movement of the main cable causes the drum to rotate to wind about it the auxiliary cable extending to the apron, thereby elevating the apron. When the apron reaches the limit of its movement, further rotation of the drum is prevented and no more of the main cable can be unwound from it; and, as a result, the continued application of tension to the main cable causes a raising of the bowl.

The accompanying drawings illustrate my invention: Fig. 1 is a side elevation of a hauling scraper to which my invention has been applied; Fig. 2 is a fragmental view similar to Fig. 1 but on an enlarged scale; Fig. 3 is a fragmental plan view illustrating details of the apron-raising and bowl-tilting mechanisms; Fig. 4 is a side elevation illustrating a means which may be employed to insure the bowl against tilting until after the apron has been raised; Fig. 5 is a diagrammatic view illustrating the arrangement of the cables; Figs. 6 and 7 are fragmental vertical sections illustrating two positions of a modified form of cable-winding drum; Fig. 8 is a fragmental side elevation illustrating a modified form of means for holding the apron raised while the bowl is tilted; and Fig. 9 is a fragmental horizontal section on the line 9—9 of Fig. 8.

The scraper illustrated in the drawings is similar to that illustrated and more fully described in my co-pending application Serial No. 350,989, filed August 3, 1940. It includes a rear frame-section 10 and a front frame-section 11 pivotally interconnected on a horizontal transverse axis as indicated at 12. The rear frame section carries rear wheels 13, the front section carries front wheels 14, and the angular position of the two frame sections about the axis 12 of their pivotal interconnection is controlled by a thrust member 15 which is pivotally connected to the rear frame section 10 at an elevated point and which extends forwardly over the front frame section 11. A cable 16, reeved over two sets of sheaves 17 and 18 mounted respectively on the front frame section and upon the thrust member, extends forwardly to a hoist (not shown) on the tractor by means of which the scraper is drawn.

Pivoted to the rear frame section 10, as at 20 is a scraper bowl 21 swingable between the full-line and dotted-line positions illustrated in Fig. 1. The full-line position is that occupied by the bowl during loading and carrying operations, and the bowl is supported in that position by being provided at its rear end with an abutment 22 which rests upon a suitable abutment 23 on the frame.

For the purpose of closing the front of the bowl and to provide additional carrying capacity, there is associated with the front end of the bowl a closure 25 rigidly attached to the front ends of arms 26 which are pivotally connected at their rear ends to the rear frame-section 10, as indicated at 27. The apron 25 and its supporting arms 26, are swingable about the axis 27 of the connection to the rear frame-section 10 between the full-line position and the dotted-line position illustrated in Fig. 1.

For the purpose of controlling the relative positions of the bowl 21 and apron 25, there is mounted upon the thrust member 15 a drum 30, which is rotatable about a horizontal transverse axis. Conveniently, this drum 30 has end flanges 31 and an intermediate flange 32 the latter serving to divide the cable-surfaces of the drum into two parts 30a and 30b. A main cable 33 has its end secured to the drum-portion 30a and extends from it over two sets of sheaves 34 and 35 mounted respectively upon the thrust member 15 and the rear end of the bowl 21, such cable, after leaving the last of the sheaves 34, passing over a pair of direction-changing sheaves 37 and 38 and extending forwardly to the hoist on the tractor.

A second or auxiliary cable 40 has one end attached to the drum-portion 30b and the other end secured to the closure 25, as is clear from Fig. 1. On the drum 30, the cables 33 and 40 are wound in opposite directions so that as the drum rotates one cable will be wound while the other is unwound. When the bowl and apron occupy the respective positions illustrated in full-lines in Fig. 1, the drum-portion 30a has wound about it a portion of the cable 33 at least equal in length to the length of cable 40 which must be wound upon the drum-portion 30b in elevating the closure 25 from its lowermost to its uppermost position.

As long as no tension is applied to the main cable 34, the bowl and apron will occupy the positions illustrated in full lines, toward which they are biased by the force of gravity. When the hoist on the tractor is operated to draw the cable 33 forwardly, the resulting tension in the cable tends to tip the bowl 21 forwardly and to rotate the drum 30, rotation of the drum being opposed by the weight of the apron 25 applied to the lower end of the auxiliary cable 40. By properly proportioning the respective radii of the drum-portions 30a and 30b on which the cables 33 and 40 are respectively wound, and by taking into account the relative weights of the bowl and apron, the sequence in which the apron and bowl are elevated may be controlled. Ordinarily, it is desired that the apron be elevated before the bowl, and I accordingly prefer to make the drum-portion 30b which receives the cable 40 smaller in diameter than the portion 30a, as thereby the tendency of the cable 40 to oppose rotation of the drum is reduced and the tendency of the cable 33 to rotate the drum is increased. Accordingly, as the cable 33 is initially moved forwardly it passes through the sheaves 34 and 35 and unwinds from the drum 30 without tilting the bowl. In unwinding, the cable 33 rotates the drum 30 and causes the cable 40 to be wound thereupon to raise the apron 25.

When the apron 25 reaches the upper limit of its movement, which may be determined by engagement of an abutment 41 on the apron with a portion of the thrust member 15, no further rotation of the drum under the influence of tension in the cable 33 is possible, and continued forward movement of the cable will cause the bowl 21 to be swung upwardly and forwardly into the dumping position illustrated in dotted-lines in Fig. 1.

If, with the bowl and apron raised as indicated in dotted lines in Fig. 1 the hoist is operated to release tension in the cable 33, the force of gravity acting upon the bowl and apron will tend to cause them to swing downwardly into the full-line positions shown in Fig. 1. Downward movement of the apron will unwind the cable 40 from the drum thus causing some of the cable 33 to be wound upon the drum. This winding of the cable 33 upon the drum occurs irrespective of the sequence in which the bowl and apron return to their lowermost positions. As a result, when it is again desired to elevate the apron and tip the bowl there will be some of the cable 33 wrapped around the drum and ready, as it unwinds, to rotate the drum and cause elevation of the apron.

If it is not desired to depend upon the relative weights of the apron and bowl to control the sequence in which they are raised and lowered, latches or locks may be provided. Thus, if it is desired that no tilting movement of the bowl will take place until after the apron 25 is completely raised, I may employ a lock or latch such as is illustrated and described in my aforesaid co-pending application. This lock comprises a latch member 45 which is pivoted on the rear frame-section 10 and which engages an abutment on the rear end of the bowl 21 to hold the bowl in its normal or full-line (Fig. 1) position. The latch member 45 is secured to a shaft 47 provided with a laterally extending arm 48 connected to a rod 49 which extends upwardly and forwardly to a point adjacent the rear end of one of the arms 26 which carries the apron 25. A spring 50 acting on the rod 49 serves normally to maintain the latch member 45 in engaged position, as shown in full-lines in Fig. 5. However, as the apron 25 approaches its position of greatest elevation, an abutment 51 on the arm 26 strikes the upper end of the rod 49 and depresses it, thus rotating the shaft 47 and latch member 45 into the dotted-line positions illustrated in Fig. 5, where the latch member clears the abutment 46 and permits the bowl to be tilted forwardly and upwardly.

If it is desired to control the sequence in which the bowl and apron are lowered after having been raised, an additional locking mechanism may be provided. I prefer, if such a means is employed, to arrange it so that the apron will be held elevated until after the bowl has neared or reached its normal position. The means shown in the drawings (Figs. 2 and 3) for accomplishing this result comprises a brake drum 60 associated with the drum 30 and operative when contracted to prevent rotation of such drum. One end of the brake drum 60 is connected by a link 61 to an abutment 62 carried by the thrust member 15, while the other end of the brake band is connected by a second link to a brake-operating lever 64 which is pivoted to the thrust member 15 as at 65. A spring 66 acting between the lever 64 and some convenient fixed point tends to contract the brake band 60 into engagement with the drum 30 and prevent rotation of the latter.

To release the brake band 60, the brake-operating lever 64 is connected by a link 67 to one arm of a bell crank 68 the other arm of which is connected to a cable 69. From its connection to the bell crank 68, the cable 69 extends over guide pulleys 70 and 71 on the rear frame-section and has its rear end connected to an intermediate point on a lever 72 pivoted to the rear frame-section 10 as at 73. The forward end of the lever 72 is disposed beneath and in position to be engaged by an abutment 75 on the rear end of the bowl 21, the arrangement being such that when the bowl is in its normal or lower position, the abutment 75 depresses the lever 72 and causes the cable 69 to rotate the bell crank 68 and to release the brake 60. As a result of this construction, whenever the bowl is out of its normal or lowermost position, the spring 66 maintains the brake band 60 contracted upon the drum 30 and prevents such rotation of the drum as would be necessary to permit lowering of the apron 25 from its elevated position.

When the parts of the scraper are in the position illustrated in Fig. 1, the latch 45 is engaged with the abutment 46 to hold the abutment 21 in its normal position, while the engagement of the abutment 75 with the lever 72 causes the brake band 60 to be released in the manner just set forth. If it is desired to fill the scraper bowl, the hoist on the pulling tractor is operated to draw the cable 33 forwardly a slight amount. As above set forth, the tension of the cable 33 tends to tip the bowl 21 forwardly and to raise the apron; but, since the bowl is held in its normal position by the latch 25, only the apron will move. When the apron has been raised sufficiently to expose the scraping edge of the bowl, the hoist is operated to release tension in the cable 16, thus permitting the center portion of the frame to drop downwardly under the influence of gravity to bring the scraping edge of the bowl into contact with the ground as set forth in my co-pending application. As the scraper is then moved over the ground, the bowl will become filled, some of the earth elevated by the scraping edge of the bowl falling forwardly onto the apron. When the operation of filling the bowl has been completed, the hoist is operated to draw the cable 16 forwardly and to release the cable 33, the former operation lifting the bowl clear of the ground and the latter causing the apron to drop to close the front end of the bowl and prevent the loss of any earth as the scraper is moved over the ground to the position where the bowl is to be emptied.

When the bowl is to be emptied, the hoist is operated to draw the cable 33 forwardly. This, as above set forth, raises the apron 25 into the dotted-line position shown in Fig. 1. As the apron reaches this position, the abutment 51 depresses the rod 49 and releases the latch 45 so that continued forward movement of the cable 33 tips the bowl forwardly and causes it to empty. As the bowl leaves its normal position, the abutment 75 moves out of contact with the lever 72 and the spring 66 contracts the brake band 60 on the drum 30 and insures that the apron 25 will remain in elevated position until after the bowl is lowered.

When it is desired to lower the bowl, it is necessary only to release tension in the cable 33. The bowl then drops under the influence of gravity, while the apron 25 is retained in elevated position because of the action of the brake band 60 in preventing rotation of the drum. As the bowl reaches its normal position, the abutment 75 strikes the lever 72 and releases the brake 60. By further release of the cable 33 the apron 25 can be lowered to any desired position. As the apron moves downwardly, the auxiliary cable 40 is unwound from the drum thus causing the drum to rotate and wrap a portion of the cable 33 to be wound thereon.

As indicated above, the sequence in which the bowl and apron are raised and lowered may be controlled by properly proportioning the radii of the drum-portions upon which the cables 33 and 40 are respectively wound. If the drum-portions are cylindrical and concentric, control of the sequence of bowl and apron movements may require the drum-portion 30b to be so small that an undesirably large number of turns of the drum are necessary to elevate the apron. To overcome this disadvantage, the construction illustrated in Figs. 6 and 7 may be employed.

In that construction, the drum-portion 30a which receives the cable 33 is arranged as before; but the cable 40 is arranged to be wrapped around a drum portion 80 which is eccentric with respect to the axis of drum-rotation and the cable 40 is arranged on the drum portion 80 so that when the apron is at its highest point the cable 40 will be tangent to the drum-portion 80 near the point thereon closest to the drum-axis. The position of the drum and cable 40 with the apron raised is shown in Fig. 7, from which it will be apparent that the weight of the apron has comparatively little tendency to rotate the drum when the apron is in its uppermost position. As a result, the value to which tension in the cable 33 must be reduced in order to permit the bowl to drop from its tilted position to its normal position may be well above the tension necessary to prevent rotation of the drum and consequent lowering of the apron.

When the bowl reaches its normal position tension in the cable 33 may be further relieved until it becomes insufficient to overcome the effect of tension in the cable 40, whereupon the apron will drop and the drum will rotate to wind some of the cable 33 about the drum-portion 30a.

I find it advantageous to make the diameter of the drum-portion 80 such that when the apron is in its lowermost position the cable 40 will leave the drum-portion 80 at about the same point as that at which it leaves the drum portion when the apron is elevated. The position of the drum when the apron is lowered is indicated in Fig. 6, where the cable 40 is again shown as tangent to the drum portion 80 near that point on the surface thereof closest to the drum-axis. As will be apparent from Fig. 6, the extent of apron movement resulting from any given angular rotation of the drum when the apron is near the lower limit of its movement is relatively small, thus making it possible for an operator to control accurately the gap between the edge of the apron and the edge of the bowl.

The arrangement illustrated in Figs. 6 and 7 makes it unnecessary to employ the brake-mechanism including the brake-band 60 illustrated in Figs. 2 and 3. The latch-mechanism 45—46, which definitely holds the bowl in its normal position until after the apron is completely elevated, is desirably included in the scraper; for, when the cable 40 is tangent to the drum-portion 80 at its point of greatest radius, as it will be at least once during elevation of the apron, the tendency of tension in the cable 40 to oppose rotation of the drum will be relatively great and in order to overcome such tendency the tension in the cable 33 might have to attain a value which, in the abscence of the latch mechanism 45—46, would be great enough to tilt the bowl.

In Figs. 8 and 9 I have illustrated a further modification of my invention showing still another means for insuring the descent of the bowl from tilted position before the apron is permitted to descend. In this arrangement, as before, the bowl is held in its normal or loading position by the latch 45 which is released through the medium of the rod 49 and abutment 51 when the apron 25 reaches a predetermined position in its opening or raising movement. As before, the apron is elevated through the medium of the cable 40, the arrangement of such cable and drum about which it is wrapped being the same as that illustrated in Figs. 6 and 7, although a concentric drum may be used if desired.

Upon the sides of the apron 25 there are mounted a pair of rollers 85 rotatable on horizontal transverse axes and disposed slightly ahead of the front edges of the side walls of the bowl 21. In the vicinity of the upper front corner of each side wall of the bucket 21 and extending rearwardly from such corner, each side wall of the bucket is contoured to cooperate with the roller 85 in a manner to be hereinafter described. Desirably, in order to increase the bearing surface for the roller 85, there is applied to the edge of the side wall of the bowl 21 an outwardly projecting flange 86 upon which the roller 85 is adapted to roll.

With the arrangement illustrated in Figs. 8 and 9, it will be obvious that forward movement of the operating cable 33 will cause rotation of the drum to which the cable 40 is attached, thus causing elevation of the apron 25. As the apron raises, the bowl will be held in its normal or loading position by engagement of the latch 45 with the abutment 46 on the rear of the bowl in the manner above set forth. It will be obvious that as the apron 25 continues to raise the lever arm of the force applied to it through the cable 40 will gradually decrease, thus causing an increase in the tension in the cable 40 and in the resistance of the cable-winding drum to rotation. This in turn, will increase tension in the cable 33 and in the tilting effort applied to the rear end of the bowl through the sheaves 35. The abutment 51 is so positioned on the apron-arm 26 that the latch 45 will be released at or shortly before tension in the cable 33 reaches a value sufficient to tilt the bowl. At this time, the roller 85 will occupy the position indicated in dotted lines as 85a in Fig. 8. When, with the latch 35 released, the tension in the cable 33 becomes sufficient to raise the rear end of the bowl, the bowl tips forwardly from the full-line to the dotted-line position shown in Fig. 8 to bring the flange 86 into engagement with the roller 85 at or near the position 85a. The upper edges of the side walls of the bowl 21 are so shaped that the flange 86, upon engaging the roller 85, will force it and the apron 25 upwardly as the bowl approaches its dumping position illustrated in dotted-lines, when the roller will occupy the position 85b.

From a consideration of Fig. 8, it will be apparent that with the bowl occupying its dumping position and with the apron 25 occupying its fully raised position, both of which positions are illustrated in dotted-lines in Fig. 8, the weight of the apron, applied to the bowl through the roller 85 in the position 85b, will tend to cause the bowl to move toward its normal or loading position. Accordingly, when tension in the cable 33 is relieved, the weight of the apron will cause the bowl to be forced rearwardly and downwardly; thus eliminating the necessity for springs or other means tending to force the bowl away from its tilted position. As the bowl descends, the apron is prevented from dropping by reason of the engagement of the roller 85 with the flange 86; and it is not until the bowl has nearly reached its loading position that the flange 86 clears the roller 85 and permits complete descent of the apron. Thus, it is unnecessary to employ the brake means illustrated in Fig. 2 for preventing rotation of the cable-winding drum until after the bowl has descended from tilted position.

In the arrangement shown in Fig. 8, the eccentricity of the drum or drum-portion upon which the cable 40 plays no part in controlling the order in which the apron and bowl return to their normal positions after a dumping operation, as this function is performed by the cooperation of the rollers 85 and the contoured edge of the bowl. However, the advantage of an eccentric drum in facilitating accurate control of the apron during loading, as set forth above in connection with the description of the machine shown in Figs. 6 and 7, is retained. If this advantage is not desired, the cable 40 may be wound upon a concentric drum or drum portion, as in the construction shown in Figs. 1 to 5.

As indicated in Fig. 9, it is desirable to space the side walls of the apron 25 inwardly for a slight distance from the side walls of the bowl 21 and to provide the edges of each side wall of the apron with a flange 87 which extends outwardly into close association with the adjacent side wall of the bowl. This construction minimizes the possibility of stones and other solid objects becoming wedged between the side walls of the bowl and apron to interfere with their relative movement or cause damage.

I claim as my invention:

1. In a hauling scraper, a tiltable bowl, a closure therefor biased downwardly toward closed position, a rotatable drum, means for tilting said bowl from scraping position, said means including a sheave on said bowl and a cable dead-ended on said drum, passing around said sheave and extending therefrom for connection to a winding means, and mechanism operated by rotation of said drum for raising said closure from closed position when said cable is unwound from said drum.

2. The invention set forth in claim 1 with the addition that said closure-raising mechanism comprises a second cable, said second cable having its end secured respectively to said drum and to said closure and being adapted to be wound upon said drum as said first cable is unwound therefrom.

3. In a hauling scraper, a frame, a bowl pivoted near its front end to said frame on a transverse axis and tiltable thereabout from a scraping position to a dumping position, a sheave near the rear of said bowl, a bowl-closure movable generally vertically between a lower position in which it closes the bowl and a raised position, a drum supported from said frame in advance of said sheave above said closure and rotatable about a horizontal transverse axis, two cables each having an end secured to said drum and extending about it in opposite directions, one of said cables extending from said drum around said sheave and forwardly for connection to a hoist and the other extending from said drum to said closure.

4. The invention set forth in claim 1 with the addition of a latch for retaining said tiltable bowl in scraping position, and latch-releasing means operated by said closure as it reaches raised position.

5. The invention set forth in claim 1 with the addition of means associated with said drum and operated by said bowl for preventing rotation of the drum except when the bowl is in or near scraping position.

6. The invention set forth in claim 3 with the addition that said drum has a concentric portion and an eccentric portion, the concentric portion receiving the first cable and the eccentric portion receiving the second cable, said eccentric portion being arranged so that when the closure is raised the cable connected to it will be tangent to the eccentric drum-portion near the point on the surface thereof closest to the axis of drum-rotation.

7. The invention set forth in claim 3 with the addition of a latch for retaining said tiltable bowl in scraping position, and latch-releasing means operated by said closure as it reaches raised position, said drum having a concentric portion and an eccentric portion, the concentric portion receiving the first cable and the eccentric portion receiving the second cable, said eccentric portion being arranged so that when the closure is raised the cable connected to it will be tangent to the eccentric drum-portion near the point on the surface thereof closest to the axis of drum-rotation.

8. In a hauling scraper having a frame and tiltable bowl swingable between a scraping position and a dumping position, a closure for said bowl biased downwardly toward closed position, a drum rotatably mounted on said frame, a cable having one end secured to said drum and the other to said closure and adapted to be wrapped around the drum to raise the closure from closed position as the drum is rotated, and a single means acting on said drum and reacting on said bowl for successively rotating the drum to raise the closure and tilting said bowl to dumping position.

9. In a hauling scraper having a frame and tiltable bowl swingable between a scraping position and a dumping position, a closure for said bowl biased downwardly toward closed position, a drum rotatably mounted on said frame, a connection between said drum and closure for raising the closure from closed position as said drum is rotated in one direction, and a single means acting on said drum and reacting on said bowl for successively rotating the drum to raise the closure and tilting said bowl to dumping position.

10. In a hauling scraper having a frame and tiltable bowl swingable between a scraping position and a dumping position, a closure for said bowl biased downwardly toward closed position, a drum rotatably mounted on said frame, a connection between said drum and closure for raising the closure from closed position as said drum is rotated in one direction, and means comprising a single cable acting on said drum and reacting on said bowl for successively rotating the drum to raise the closure and tilting said bowl to dumping position.

11. The invention set forth in claim 8 with the addition that the cable-receiving surface of said drum is eccentric to the axis of drum-rotation and disposed so that when the closure is raised the cable will be tangent to the drum-surface near the point thereon closest to the axis of drum-rotation.

12. The invention set forth in claim 8 with the addition that the cable-receiving surface of said drum is eccentric to the axis of drum-rotation and disposed so that when the closure is in closed position the cable will be tangent to the drum-surface near the point thereon closest to the axis of drum-rotation.

13. In a hauling scraper having a frame and tiltable bowl swingable between a scraping position and a dumping position, a closure for said bowl biased downwardly toward closed position, mechanism for raising said closure from closed position, and means for simultaneously acting on said bowl and closure-raising mechanism tending to tilt the bowl to dumping position and to raise the closure from closed position, said closure-raising mechanism providing a variable mechanical advantage greatest when the closure is closed.

14. In a hauling scraper having a frame and tiltable bowl swingable between a scraping position and a dumping position, a closure for said bowl biased downwardly toward closed position, mechanism for raising said closure from closed position, and means for simultaneously acting on said bowl and closure-raising mechanism tending to tilt the bowl to dumping position and to raise the closure from closed position, said closure-raising mechanism providing a variable mechanical advantage greatest when the closure is raised.

15. The invention set forth in claim 1 with the addition of means operative upon tilting of said bowl from scraping position to limit descent of said closure, said means including a cam surface on said bowl and a cam-follower on said closure.

16. The invention set forth in claim 1 with the addition of means operative upon tilting of said bowl from scraping position to limit descent of said closure.

17. In a hauling scraper having a frame and tiltable bowl swingable between a scraping position and a dumping position, a closure for said bowl biased downwardly toward closed position, mechanism for elevating said closure and for tilting said bowl, and means for further elevating and supporting said closure as said bowl approaches its dumping position, said means including a cam surface on said bowl and a cam-follower on said closure.

18. In a hauling scraper having a frame and tiltable bowl swingable between a scraping position and a dumping position, a closure for said bowl biased downwardly toward closed position, mechanism for elevating said closure and for tilting said bowl, and means for further elevating and supporting said closure as said bowl approaches its dumping position.

19. In a hauling scraper having a frame and tiltable bowl swingable between a scraping position and a dumping position, a closure for said bowl biased downwardly toward closed position, mechanism for elevating said closure and for tilting said bowl, and means for further raising and supporting said closure from said bowl when said bowl is in dumping position and said closure raised, said means reacting upon said bowl with a force biasing the bowl from dumping position toward scraping position.

20. In a hauling scraper having a frame and tiltable bowl swingable between a scraping position and a dumping position, a closure for said bowl, said bowl and closure having overlapping side walls with the side walls of the closure spaced inwardly from the side walls of the bowl, and a flange extending outwardly from the edge of each closure side-wall into close association with the adjacent bowl side-wall.

WAYNE H. McGLADE.

CERTIFICATE OF CORRECTION.

Patent No. 2,306,892. December 29, 1942.

WAYNE H. McGLADE.

It is hereby certified that error appears in the printed specification of the above numbered patent requiring correction as follows: Page 2, second column, line 21, after "desired" insert --to insure--; page 4, second column, line 48, claim 2, for "end" read --ends--; and that the said Letters Patent should be read with this correction therein that the same may conform to the record of the case in the Patent Office.

Signed and sealed this 23rd day of February, A. D. 1943.

(Seal)

Henry Van Arsdale,
Acting Commissioner of Patents.